United States Patent [19]

Kaufhold et al.

[11] 4,231,915

[45] Nov. 4, 1980

[54] USE OF DI-(CYCLOHEXYLETHYLMETHYLOL) PHTHALATES OR DI-(ETHYLCYCLOHEXYLMETHYLOL) PHTHALATES AS PLASTICIZERS FOR POLYVINYL CHLORIDE

[75] Inventors: Manfred Kaufhold; Dieter Hepp; Gerhard Menzel, all of Marl, Fed. Rep. of Germany

[73] Assignee: Chemische Werke Hüls Aktiengesellschaft, Marl, Fed. Rep. of Germany

[21] Appl. No.: 26,983

[22] Filed: Apr. 4, 1979

[30] Foreign Application Priority Data

Apr. 4, 1978 [DE] Fed. Rep. of Germany ....... 2814400

[51] Int. Cl.³ .................. C08K 5/11; C08L 27/06
[52] U.S. Cl. .................. 260/31.8 R; 260/31.8 W; 560/84
[58] Field of Search ................ 260/31.8 R, 31.8 W; 560/84

[56] References Cited

U.S. PATENT DOCUMENTS

| T896,008 | 3/1972 | Valentine | 260/475 |
| 2,227,154 | 12/1940 | Russell | 260/30.6 R |

FOREIGN PATENT DOCUMENTS 466245 6/1950 Canada ....................... 560/84

2542821 4/1976 Fed. Rep. of Germany .... 260/31.8 W

Primary Examiner—Joseph L. Schofer
Assistant Examiner—Peter F. Kulkosky
Attorney, Agent, or Firm—Millen & White

[57] ABSTRACT

In a method of plasticizing polyvinyl chloride by adding a plasticizer to polyvinyl chloride, an improvement is provided wherein the plasticizer is a di-(cyclohexylethylmethylol) phthalate or a di-(ethylcyclohexylmethylol) phthalate of the formula

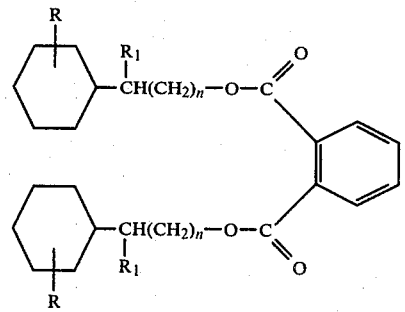

wherein R is ethyl or hydrogen; $R_1$ is methyl or hydrogen; and n is an integer of 0–2; and when n is 2, R is H and $R_1$ is H; when n is 0, R is ethyl and $R_1$ is H, and when n is 1, $R_1$ is methyl and R is H; the two alcohol radicals being the same or different.

12 Claims, 1 Drawing Figure

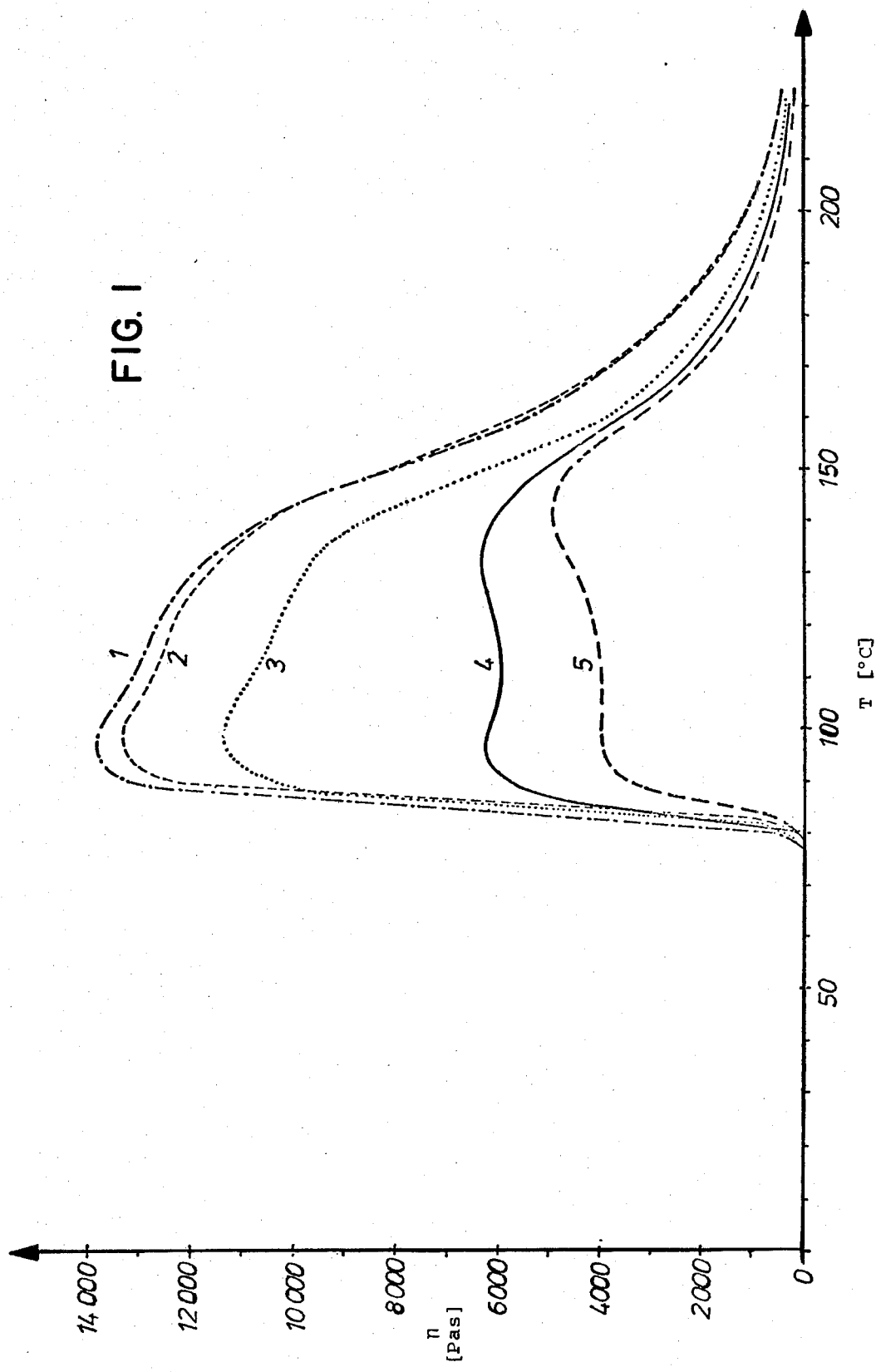

USE OF DI-(CYCLOHEXYLETHYLMETHYLOL) PHTHALATES OR DI-(ETHYLCYCLOHEXYLMETHYLOL) PHTHALATES AS PLASTICIZERS FOR POLYVINYL CHLORIDE

BACKGROUND OF THE INVENTION

The present invention relates to plasticizers for polyvinyl chloride and compositions thereof.

Since polyvinyl chloride (PVC) is a relatively brittle material at normal temperatures, so-called plasticizers are added to it for use in numerous fields of application. Plasticizers are, in general, high-boiling organic liquids which are able to form a homogeneous solid phase with polyvinyl chloride.

However, a good plasticizer should, in addition to its plasticizing action, also exhibit the following properties when used with polyvinyl chloride:

(1) High gelling capacity; this means that a polyvinyl chloride/plasticizer mixture should gel as rapidly as possible and, hence, should be ready for further conversion processing within a short time.
(2) Low volatility; that is, high migration resistance.
(3) High strength and surface hardness.
(4) Good dielectric behavior.

Numerous esters of phthalic acid are already known as plasticizers for polyvinyl chloride. The most estensively used plasticizers include butyl benzyl phthalate, dinonyl phthalates, di(cyclohexyl) phthalate, di-(methyl-cyclohexyl) phthalate and di-(2-ethyhexyl) phthalate (dioctyl phthalate). Butyl benzyl phthalate exhibits several disadvantages: it has an intrinsic odor, is comparatively volatile, and is not light-resistant (compare Ullmanns Enzyklopädie d. techn. Chemie (Ullmann's Encyclopaedia of Industrial Chemistry), volume 18, (1967), page 560). The nonyl phthalates above all exhibit a relatively unsatisfactory gelling capacity. Di-(cyclohexyl) phthalate is a powder which melts at about 64° C. and di(methylcyclohexyl) phthalate has an unacceptably high viscosity of 15,000 to 25,000 mPas at 20° C. Hence, their usefulness as plasticizers is limited.

Because of the problems described, compromises must often be struck when plasticizing polyvinyl chloride. For example, mixtures of plasticizers are employed. In doing so, those plasticizers are selected which bring about a particular desired property and in spite of being mixed with other plasticizers impart this property to the finished plastic. However, it would be desirable to have substances which do not require such compromises and can be employed as sole plasticizers. Di-(2-ethylhexyl) phthalate does exhibit satisfactory values of the important properties of gelling capacity and migration resistance; but these values undoubtedly still warrant improvement.

SUMMARY OF THE INVENTION

It is, accordingly, an object of the present invention to provide plasticizers for PVC which are not subject to the abovementioned disadvantages and which possess improved desirable properties of gelling capacity, volatility, strength, surface hardness and/or dielectric characteristics.

Upon further study of the specification and appended claims, further objects and advantages of this invention will become apparent to those skilled in the art.

These objects have been achieved, surprisingly, by providing polyvinyl chloride/plasticizer mixtures of distinctly improved gelling capacities and substantially better migration resistances by using as plasticizers for polyvinyl chloride di-(cyclohexylethylmethylol) phthalates or di-(ethylcyclohexylmethylol) phthalates of the formula

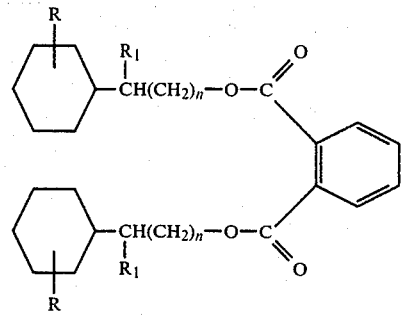

wherein R is ethyl or hydrogen; $R_1$ is methyl or hydrogen; n is an integer of 0 to 2; and R=H if n=2 and $R_1$=H; R=ethyl if n=0 and $R_1$=H; and $R_1$=methyl if n=1 and R=H; the number of carbon atoms present in the alcohol radical being always 9 and the two alcohol radicals being the same or different. Thus the invention involves the discovery that, unexpectedly, the above-defined phthalate esters are surprisingly superior plasticizers for PVC.

A very advantageous embodiment of the present invention is the use of di-(cyclohexylethylmethylol) phthalates which have been prepared from a mixture of 2-cyclo-hexylpropan-1-ol and 3-cyclohexylpropan-1-ol.

Another very advantageous embodiment is the use of di-(ethylcyclohexylmethylol) phthalates which have been prepared from a mixture of all isomeric ethylcyclohexylmethylols.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 1 shows the gelling capacity of two prior art compositions (4 and 5) and several compositions of this invention (1, 2 and 3).

DETAILED DISCUSSION

Since, in general, the lower the molecular weight of a plasticizer, the better its gelling action is, the distinctly better gelling capacity of the plasticizers of this invention was highly surprising. For example, see FIG. 1 which shows results for the plasticizers of this invention, containing 9 carbon atoms in the alcohol radical, compared to e.g., di-(2-ethylhexyl) phthalate which contains only 8 carbon atoms in the alcohol radical. Furthermore, the extraordinary migration resistance of the phthalates to be used according to this invention, compared with those of the same reference substance, can also not be explained by the slight differences in molecular weight; instead, it must be regarded as surprising to those skilled in the art.

The plasticizers of this invention can be employed as sole plasticizers without addition of other plasticizing substances, since, because of their viscosity of 500 to 1,500 mPas and their other excellent properties, they do not require any improvement by admixture.

The alcohols on which the esters to be employed according to this invention are based include (a) 3-cyclohexylpropan-1-ol, (b) 2-cyclohexylpropan-1-ol, (c) 1-ethylcyclohexyl-1-methylol, (d) 2-ethylcyclohexyl-1-methylol, (e) 3-ethylcyclohexyl-1-methylol, and (f) 4-ethylcyclohexyl-1-methylol, of the formulae,

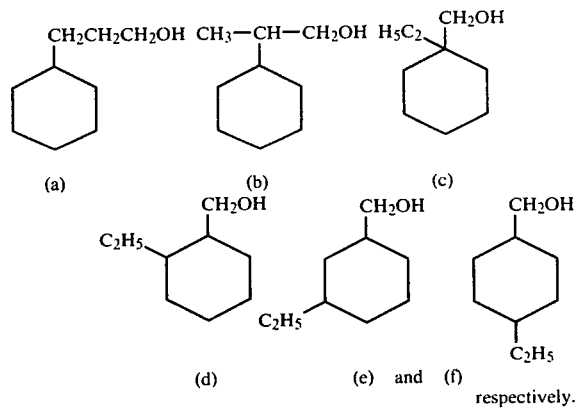

respectively.

The phthalates to be employed according to this invention may contain the radicals of only one of the above-mentioned alcohols. In general, however, alcohol mixtures will be used for their preparation, since the industrial manufacture of these alcohols yields mixtures.

Thus, in accordance with the conventional industrial manufacture of such alcohols, in general, the esters which are included within the scope of this invention include those which may be formed from a mixture of alcohols a and b or from a mixture of alcohols c–f. However, the invention, of course, generically includes the esters which may be derived from a mixture of any of the alcohols a–f. Accordingly, the terms di-(cyclohexylethylmethylol) phthalates and di-(ethylcyclohexylmethylol) phthalates, are not meant to be restrictive, but rather refer to the industrially preferred groups of plasticizers.

The alcohols are prepared in a known manner by hydroformylation of olefins having the basic skeleton of ethylcyclohexane. The olefin may contain 1, 2 or 3 double bonds. An industrially easily accessible olefin is, for example, 4-vinylcyclohex-1-ene, which is often formed as a by-product in syntheses involving butadiene. (Compare British Patent Specification No. 808,124, Ruhrchemie, Jan. 28, 1959.).

The hydrogenation of the aromatic ring in the phenylpropanols offers an alternative industrially realizable route for obtaining two of the abovementioned alcohols, namely 3-cyclohexylpropan-1-ol and 2-cyclohexylpropan-1-ol. Regarding syntheses of phenylpropanols, see Cornils et al, Chemikerzeitung 98 (1974), No. 12, page 596).

Furthermore, the generally customary syntheses of alcohols, such as the reduction of acids or esters, the conversion of corresponding halogen compounds into esters and the subsequent saponification of the latter to give alcohols, and various others, are also possible methods of preparation.

The abovementioned alcohols can be converted to the plasticizer ester by reaction with phthalic anhydride, in a known manner. Descriptions of such esterifications are to be found in the monograph "Phthalsaureanhydrid und seine Verwendung" ("Phthalic Anhydride and its Use") by Hubert Suter, Dr. Dietrich Steinkopff-Verlag, Darmstadt 1972, page 76 et seq, whose disclosure is incorporated by reference herein.

The phthalic acid esters to be used according to this invention can be mixed with polyvinyl chloride using fully conventional conditions and methods and can be converted either to plasticized PVC or to PVC pastes, as described in the PVC-Handbuch (PVC Handbook) by Krekeler-Wick, Carl Hanser Verlag, Munich 1963, volume II, page 335 et seq. and page 404 et seq., whose disclosure is incorporated by reference herein. For example 20–50 weight parts, preferably 25 weight parts, of plasticizer per 100 weight parts of PVC and plasticizer can be employed.

It can be seen from the table which follows, and from FIG. 1, that the migration resistance and gelling capacity of the phthalates to be used according to this invention exhibit a surprising improvement. According to the table, the migration of pastes made per this invention is several-fold better (that is, is only ½ to 1/5), as compared to pastes containing benzyl butyl phthalate or di-(2-ethylhexyl) phthalate as plasticizers. This several-fold improved migration resistance compared to di-(2-ethylhexyl) phthalate, which has only a slightly lower molecular weight, is entirely surprising and confirms the selective character of the present invention.

Since, on the other hand, as is known to those skilled in the art, the gelling capacity of a plasticizer in general decreases with increasing molecular weight of the plasticizer, the substantially improved gelling capacity of the pastes per this invention, compared to pastes containing di-(2-ethylhexyl) phthalate, as shown in FIG. 1, was entirely surprising and is a further confirmation of the selective character of the present invention.

TABLE

Mechanical values obtained with plasticised PVC sheets

| Plasticiser | | Di-(ethylcyclohexylmethylol) phthalate (isomer mixture) | | | Benzyl butyl phthalate | | |
|---|---|---|---|---|---|---|---|
| PVC/plasticiser ratio | | 70/30 | 60/40 | 50/50 | 70/30 | 60/40 | 50/50 |
| Tensile strength, | N/mm$^2$ | 32 | 21 | 14 | 25 | 18 | 11 |
| Elongation at break, | % | 300 | 310 | 390 | 280 | 370 | 440 |
| Shore A hardness | | 95 | 82 | 58 | 89 | 70 | 55 |
| Shore D hardness | | 57 | 31 | 16 | 40 | 22 | 12 |
| Volatility, %, DIN 53 407 (24 hours at 90° C.) | | 0.49 | 0.60 | 0.60 | 2.68 | 4.2 | 6.4 |
| Brittle temperature, | °C. | ±0 | −7 | −16 | −10 | −25 | −33 |
| Water storage, | mg | +6 | +7 | +7 | +10 | +9 | +11 |
| | 23° C. | $1.1 \times 10^{15}$ | $6.2 \times 10^{13}$ | $1.3 \times 10^{12}$ | $7.8 \times 10^{13}$ | $5.4 \times 10^{11}$ | $3 \times 10^{10}$ |
| Specific resistance Ohm. cm | 70° C. | $2.4 \times 10^{11}$ | $6 \times 10^{10}$ | $1 \times 10^{10}$ | $3 \times 10^{10}$ | $3 \times 10^{9}$ | $6 \times 10^{8}$ |
| Loss factor | | 0.103 | 0.125 | 0.077 | 0.126 | 0.092 | 0.176 |
| Dielectric constant | | 4.1 | 5.1 | 7.0 | 5.4 | 8.3 | 9.1 |

TABLE-continued

| Migration | | | | | | | |
|---|---|---|---|---|---|---|---|
| Towards polystyrene | 1 | 0.4 | 1.7 | 3.0 | 2.5 | 7.1 | 16.2 |
| | 32 | 4.2 | 10.7 | 21.5 | 13.7 | 24.7 | 37.8 |
| Towards polyvinyl chloride | 1 | 0.36 | 0.84 | 1.84 | 5.9 | 11.1 | 22.5 |
| | 32 | 3.03 | 7.5 | 15.6 | 14.3 | 24.6 | 37.8 |

| | Plasticiser | | Di-(2-ethylhexyl) phthalate | | |
|---|---|---|---|---|---|
| | PVC/plasticiser ratio | | 70/30 | 60/40 | 50/50 |
| Tensile strength, | | N/mm$^2$ | 25 | 18 | 10 |
| Elongation at break, | | % | 320 | 420 | 460 |
| Shore A hardness | | | 90 | 74 | 58 |
| Shore D hardness | | | 40 | 23 | 12 |
| Volatility, %, DIN 53 407 (24 hours at 90° C.) | | | 1.7 | 2.34 | 3.79 |
| Brittle temperature, | | °C. | −28 | −39 | −48 |
| Water storage, | | mg | +8 | +9 | +8 |
| | | 23° C. | $9.1 \times 10^{12}$ | $5.4 \times 10^{11}$ | $9 \times 10^{10}$ |
| Specific resistance Ohm, cm | | 70° C. | $2.3 \times 10^{10}$ | $7 \times 10^9$ | $3 \times 10^9$ |
| Loss factor | | | 0.095 | 0.069 | 0.096 |
| Dielectric constant | | | 6.1 | 7.3 | 7.6 |
| Migration | | | | | |
| Towards polystyrene | | 1 | 1.17 | 2.74 | 6.22 |
| | | 32 | 10.4 | 21.0 | 34.3 |
| Towards polyvinyl chloride | | 1 | 0.78 | 1.72 | 3.52 |
| | | 32 | 7.78 | 15.1 | 26.1 |

MEASUREMENT OF THE GELLING CAPACITY

The plasticizers are mixed with PVC in the ratio of 100:70 (100 parts of PVC VESTOLIT® 7031 and 70 parts of plasticizer), to form a paste. The paste is filled into a Reometric Mechanical Spectrometer, in so-called plate-plate geometry (gap width: 1 mm) and is heated at a linear rate of 15° C./min. At the same time the sample is subjected to an oscillation of 1 c/s and low amplitude. The dynamic viscosity is determined from the forces measured. The measured levels of the viscosity in the gelling range are a measure of the gelling capacity of the plasticizer. They show the degree of interaction between the plasticizer and the polymer.

The curves in FIG. 1 are as follows:

1 A mixture of di-(2- and 3-cyclohexylpropyl) phthalate
2 An isomer mixture of all di-(ethylcyclohexylmethylol) phthalates
3 Di-(3-cyclohexylpropyl) phthalate
4 Di-(2-ethylhexyl) phthalate
5 Di-(isononyl) phthalate The use, according to this invention of the di-(cyclohexylethylmethylol) phthalates or di-(ethylcyclohexylmethylol) phthalates offers yet further advantages compared to polyvinyl chloride plasticized with di-(2-ethylhexyl) phthalates, as is shown, for example, by the technological experiments described below.

Since the polyvinyl chloride mixtures which have been plasticized according to this invention show good gelling throughout the material, the sheets prepared threfrom are not as easily tearable as comparison samples. Surprisingly, the sheets are also more transparent and have a better surface gloss than those produced with dioctyl phthalate. In addition they have a high Shore hardness and a so-called dry touch. Associated with the last-mentioned property is the fact that the so-called blocking is less in the case of the sheets containing the new plasticizers than in the case of sheets with dioctyl phthalate. While sheets with dioctyl phthalate plasticizer stick to one another, sheets produced according to this invention slide over one another surprisingly easily.

A further fact to be noted is that as a result of the heretofore unachieved combination of properties of the plasticized PVC, e.g., the excellent heat stability in conjunction with the outstanding electrical values and with high migration resistance and surface hardness, new fields of application for polyvinyl chloride can be opened up, such as, for example, heat-resistant cable compositions for severe conditions, chemically resistant coatings, and profiles having a high tensile strength.

In addition to homopolyvinyl chloride, the phthalate esters of this invention may be used as plasticizers in conjunction with other polymers such as copolymers of vinyl chloride with copolymerisable comonomers such as acrylic acid, methacrytic acid, vinyl acetate, vinylidene chloride, etc., wherein, in general, up to 5-50% of the comonomer may be employed. The use of these plasticizers in such fashion is in accordance with conventional procedures for known plasticizers for each of these polymers.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

Preparation of the phthalic acid esters 1. (a) Hydroformylation of vinylcyclohexene 500 ml of isobutanol and 13.5 g of cobalt acetate (with 4 moles of water of crystallization) are initially introduced into a 5 l autoclave and stirred. The cobalt carbonyl hydride is synthesized in the course of 2 hours at 180° C. and 270 bar synthesis gas pressure. 2,170 g of 4-vinylcyclohex-1-ene (stabilized with 50 ppm of hydroquinone) are added at 170°–185° C., at a speed such that the heat evolved can be conducted away (duration about 5 hours). Thereafter, stirring is continued for 6 hours at 180° C. and 270 bars synthesis gas pressure.

The mixture is then cooled; 600 ml of water are added; and the synthesis gas is replaced by hydrogen.

The oxo catalyst is destroyed by heating to 150° C. while stirring for three hours.

After adding isobutanol, the material discharged from the reactor is washed with water. It is then posthydrogenated over a copper chromite catalyst at 180° C. Thereafter, the product is distilled. i-Butanol is distilled off under normal pressure. 978 g of the desired monoalcohol is distilled, at 13 mbar, over a boiling range of about 96 to 113° C.

Over a boiling range of 172° to 182° C. at 13 mbar, 365 g of a diol mixture were obtained. This mixture is also a valuable product, for example for polyester resins.

According to analysis by gas chromatography, the desired monoalcohol mixture comprises about 21% of 3-cyclohexyl propan-1-ol and about 14% of 2-cyclohexylpropan-1-ol. The remaining isomers can be determined quantitatively, but cannot be identified exactly.

The conversion in the oxo reaction is more than 98%. 100 moles of vinylcyclohexene give about 61 moles of monoalcohols and about 18 moles of diols.

(b) Synthesis of a 2- and 3-cyclohexylpropanol isomer mixture

Styrene is hydroformylated in the usual manner, for example in accordance with German Auslegeschrift No. 1,793,017; and a mixture of 2- and 3-phenylpropanols is produced. By selecting a particular reaction temperature between 100 and 180° C., the content of 3-phenylpropanol can be selected to have a value between 16.5 and 52%.

The phenylpropanol mixture is hydrogenated over a Pd catalyst at 300 bars hydrogen pressure and 140° C. The material discharged from the hydrogenation reaction shows the following analysis:

| | |
|---|---|
| Acid number | 0.1 |
| Carbonyl number | 0.09 |
| Bromine number | 0.07 |
| Content of aromatics according to UV spectrum: | 0.1% |

The isomers can be isolated in a pure form by distillation.

2. Esterification

This can be carried out as described in the monograph by Hubert Suter "Phthalsäureanhydrid und seine Verwendung" ("Phthalic Anhydride and its Use"), Dr. Dietrich Steinkopff-Verlag, Darmstadt 1972, page 76 et seq.

The phthalates of the abovementioned alcohol mixtures are obtained.

EXAMPLE 3

The use of di-(ethylcyclohexylmethylol) phthalate* for conversion to soft PVC compositions 1. Processing by spreading Mixtures of polyvinyl chloride and di-(ethylcyclohexylmethylol) phthalate* were converted into soft paper coatings (for example wallpapers) by applying them to the paper as plastisols, with the aid of a doctor blade (working speed 4 m/min) and then gelling them for 2 minutes at 180° C.
*An isomer mixture obtained by hydroformylation of vinylcyclohexene The processing data and, above all, the final properties were substantially more advantageous than those of a paste with dioctyl phthalate as the plasticizer. Especially superior were the relatively dry touch, the soil-repellent and easily washable surface, and the high strength.

| Formulation | Shore hardness | Tensile strength [n/m²] | Water Absorption [mg] | Gelling** [Nm] |
|---|---|---|---|---|
| 100 parts of polyvinyl chloride (K value 70) 2 parts of organo-tin stabilizer 100 parts of dioctyl phthalate | 59 | 10 | 30 | 9 |
| or 100 parts of di-(ethylcyclohexylmethylol) phthalate | 63 | 14 | 24 | 13 |

**Torque during plasticization, in a Brabender after 15 minutes at 140° C.

2. Conversion to tarpaulin materials

Plastisols with di-(ethylcyclohexylmethylol) phthalate* and a phthalic acid ester mixture¹* were converted, in comparison with dioctyl phthalate, to tarpaulin materials by spreading a 9/9 polyester fabric and gelling the coating. The composition was:
  100 parts of polyvinyl chloride (K value 70)
  30 parts of phthalic acid ester mixture¹*
  2 parts of Ba-Cd-Zn stabilizer
  (a) 35 parts of dioctyl phthalate
  (b) 35 parts of di-(ethylcyclohexylmethylol) phthalate
*An isomer mixture obtained by hydroformylation of vinylcyclohexene
¹* Phthalic acid esters, wherein the alcohol component consists of C₇- to C₁₁-oxo-alcohols (the content of straight-chain compounds being from 70 to 80%).

The increased viscosity in the high shear range prevents the paste from striking through the fabric, and this results in an increase in the tear propagation resistance of the tarpaulin material). Furthermore, the tarpaulin materials plasticized according to the invention exhibit, compared to the prior art, a drier touch (coatings do not stick to one another) and substantially higher migration resistance towards polyvinyl chloride and polystyrene.

3. Conversion to dip coatings

Dip coatings such as, for example, the coating of metal articles (tool handles) were carried out with the formulation mentioned under 1.

Compared to the plastisol obtained with dioctyl phthalate, the following advantages, even in processing alone, manifested themselves as a result of the use of di-(ethylcyclohexylmethylol) phthalate:

(a) To achieve equally thick coatings, lower preheat times or preheat temperatures (which save energy costs) are needed, due to the higher viscosity and higher gelling capacity.

(b) As a result of the more rapid solidification during gelling, the finished articles can be produced with shorter processing times or lower processing temperatures.

In addition to the dry touch already mentioned, the coatings also exhibit excellent electrical properties compared to articles plasticized with dioctyl phthalate:

| Volume resistivity | 23° C. | 70° C. |
|---|---|---|
| Dioctyl phthalate | $9 \times 10^{10} \Omega cm$ | $3 \times 10^{9} \Omega cm$ |
| Di(ethylcyclohexylmethylol) phthalate | $1.3 \times 10^{12} \Omega cm$ | $1 \times 10^{10} \Omega cm$ |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a method of plasticizing polyvinyl chloride by adding a plasticizer to polyvinyl chloride, the improvement wherein the plasticizer is a di-(cyclohexylethylmethylol) phthalate or a di-(ethylcyclohexylmethylol) phthalate of the formula

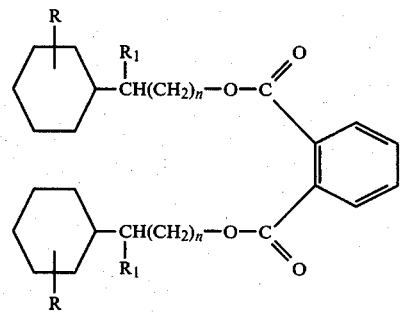

wherein R is ethyl or hydrogen; $R_1$ is methyl or hydrogen; and n is an integer of 0–2; and when n is 2, R is H and $R_1$ is H; when n is 0, R is ethyl and $R_1$ is H, and when n is 1, $R_1$ is methyl and R is H; the two ester radicals being the same or different.

2. The method of claim 1 wherein the plasticizer is a mixture of phthalates wherein n is 1, $R_1$ is methyl and R is H; and n is 2, R is H and $R_1$ is H.

3. The method of claim 1 wherein the plasticizer is a mixture of all isomeric phthalates wherein n is 0, $R_1$ is H and R is ethyl, the isomerism being that of the position of the ethyl group on the cyclohexyl ring.

4. A plasticized polyvinyl chloride comprising polyvinyl chloride and a plasticizing amount of a di-(cyclohexylethylmethylol) phthalate or a di(ethylcyclohexylmethylol) phthalate of the formula

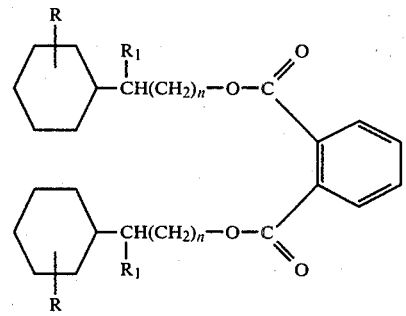

wherein R is ethyl or hydrogen; $R_1$ is methyl or hydrogen; and n is an integer of 0–2; and when n is 2, R is H and $R_1$ is H; when n is 0, R is ethyl and $R_1$ is H, and when n is 1, $R_1$ is methyl and R is H; the two alcohol radicals being the same or different.

5. The composition of claim 4 wherein the plasticizer is a mixture of phthalates wherein n is 1, $R_1$ is methyl and R is H; and n is 2, R is H and $R_1$ is H.

6. The composition of claim 4 wherein the plasticizer is a mixture of all isomeric phthalates wherein n is 0, $R_1$ is H and R is ethyl, the isomerism being that of the position of the ethyl group on the cyclohexyl ring.

7. A di-(cyclohexylethylmethylol) phthalate or a di-(ethylcyclohexylmethylol) phthalate of the formula

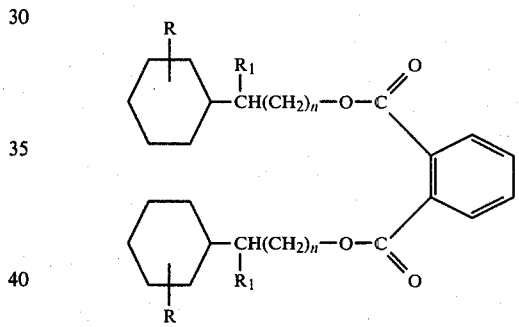

wherein R is ethyl or hydrogen; $R_1$ is methyl or hydrogen; and n is an integer of 0–2; and when n is 2, R is H and $R_1$ is H; when n is 0, R is ethyl and $R_1$ is H, and when n is 1, $R_1$ is methyl and R is H; the two alcohol radicals being the same or different.

8. The method of claim 2 wherein the plasticizer is a mixture of phthalate esters which have been prepared from a mixture of 2-cyclohexylpropan-1-ol and 3-cyclohexylpropan-1-ol.

9. The method of claim 3 wherein the plasticizer is a mixture of phthalate esters which has been prepared from a mixture of all isomeric ethyl cyclohexylmethylols.

10. The composition of claim 5 wherein the plasticizer is a mixture of phthalate esters which have been prepared from a mixture of 2-cyclohexylpropan-1-ol and 3-cyclohexylpropan-1-ol.

11. The composition of claim 6 wherein the plasticizer is a mixture of phthalate esters which has been prepared from a mixture of all isomeric ethyl cyclohexylmethylols.

12. The method of claim 1 wherein the plasticizer is di-(3-cyclohexylpropyl) phthalate.

* * * * *